United States Patent [19]

Krause et al.

[11] Patent Number: 5,612,742

[45] Date of Patent: Mar. 18, 1997

[54] METHOD AND APPARATUS FOR ENCODING AND FORMATTING DATA REPRESENTING A VIDEO PROGRAM TO PROVIDE MULTIPLE OVERLAPPING PRESENTATIONS OF THE VIDEO PROGRAM

[75] Inventors: Edward A. Krause; Paul Shen, both of San Diego; Adam S. Tom, La Jolla, all of Calif.

[73] Assignee: Imedia Corporation, San Francisco, Calif.

[21] Appl. No.: 326,511

[22] Filed: Oct. 19, 1994

[51] Int. Cl.$^6$ ....................................... H04N 7/24
[52] U.S. Cl. ........................ 348/385; 348/387; 348/409
[58] Field of Search ................................ 348/385, 387, 348/388, 409, 426, 469; H04N 7/24

[56] References Cited

U.S. PATENT DOCUMENTS

| | | | |
|---|---|---|---|
| 4,343,042 | 8/1982 | Schrock et al. | 455/5 |
| 4,521,806 | 6/1985 | Abraham | 358/86 |
| 4,567,512 | 1/1986 | Abraham | 358/86 |
| 4,590,516 | 5/1986 | Abraham | 358/86 |
| 4,616,263 | 10/1986 | Eichelberger | 358/185 |
| 4,829,372 | 5/1989 | McCalley et al. | 358/86 |

(List continued on next page.)

FOREIGN PATENT DOCUMENTS

| | | | |
|---|---|---|---|
| 0527632 | 2/1993 | European Pat. Off. | 348/387 |
| 0605115 | 12/1993 | European Pat. Off. | |
| 0103438 | 3/1984 | United Kingdom | H04N 7/10 |
| WO91/03112 | 3/1991 | WIPO | |
| WO92/11713 | 7/1992 | WIPO | |
| 9305593 | 3/1993 | WIPO | H04H 1/02 |
| WO94/10775 | 5/1994 | WIPO | |

OTHER PUBLICATIONS

Soviero, Marcelle M., "R & D—Get Ready for Digital VCRs," *Popular Science*, Dec. 1993, p. 38.
Wayner, Peter, "State of the Art—Digital Video Goes Real-Time," *BYTE*, Jan. 1994, pp. 107–112.
Kupfer, Andrew, "Any Movie, Anytime," *Fortune*, Jan. 25, 1993, p. 83.

(List continued on next page.)

*Primary Examiner*—Victor R. Kostak
*Attorney, Agent, or Firm*—McCutchen Doyle Brown & Enersen

[57] ABSTRACT

Virtually random and on-demand access is provided to a virtually unlimited number of subscribers by partitioning the video program into an ordered sequence of n segments and providing the subscribers concurrent access to each of the n subsequences. A data stream representative of the video program is partitioned into n subsequences, each representative of one of the n segments. The data of each of the n subsequences is organized as an ordered sequence of elements. The elements of each of the n subsequences are interleaved and the interleaved data stream is continuously transmitted over a video program distribution medium at a rate which renders the data representing each segment concurrently available to any subscriber having a receiver capable of selecting, assembling, and displaying the data of a particular segment. The data stream can be compressed prior to interleaving using one of many known video data compression standards and techniques. Data compression can be performed in real time, or iteratively using software. The interleaved data stream can be transmitted in real time, or it can be stored on a storage device such as a hard disk or optical disk for later retrieval and transmission. The interleaved data stream can be ordered using any known standard by which video data is transmitted for reconstruction and display by a receiver. Data can be inserted into the interleaved data stream to inform the receiver to which of the n segments a portion of the interleaved data stream belongs, as well as the encoding level necessary for decompression of the data and time stamps to indicate order of display.

26 Claims, 6 Drawing Sheets

U.S. PATENT DOCUMENTS

| | | | |
|---|---|---|---|
| 4,862,268 | 8/1989 | Campbell et al. | 358/141 |
| 4,901,367 | 2/1990 | Nicholson | 455/5 |
| 4,975,771 | 12/1990 | Kassaly | 348/469 |
| 5,014,125 | 5/1991 | Pocock et al. | 358/86 |
| 5,051,822 | 9/1991 | Rhoades | 358/86 |
| 5,111,309 | 5/1992 | Hang | 348/426 |
| 5,119,188 | 6/1992 | McCalley et al. | 358/86 |
| 5,130,792 | 7/1992 | Tindell et al. | 358/85 |
| 5,168,353 | 12/1992 | Walker et al. | 358/86 |
| 5,191,410 | 3/1993 | McCalley et al. | 358/86 |
| 5,220,420 | 6/1993 | Hoarty et al. | 358/86 |
| 5,231,486 | 7/1993 | Acampora et al. | 348/426 |
| 5,243,629 | 9/1993 | Wei | 348/426 |
| 5,253,341 | 10/1993 | Rozmanith et al. | 395/200 |
| 5,309,450 | 5/1994 | Kim | 348/469 |
| 5,315,584 | 5/1994 | Savary et al. | 370/18 |
| 5,319,457 | 6/1994 | Nakahashi et al. | 348/387 |
| 5,421,031 | 5/1995 | De Bey | 455/5.1 |

OTHER PUBLICATIONS

"Digital HDTV Recorders—The Next Best Thing to Being There," *Popular Science*, Apr. 1993, p. 61.

Karpinski, Richard, "Bell Atlantic Patents ADSL Video-on-Demand," *Telephony*, Nov. 1, 1993, p. 7.

Gelman, et al, *A Store-and Forward Architecture for Video-On-Demand Service, IEEE,* 1991, pp. 842–846.

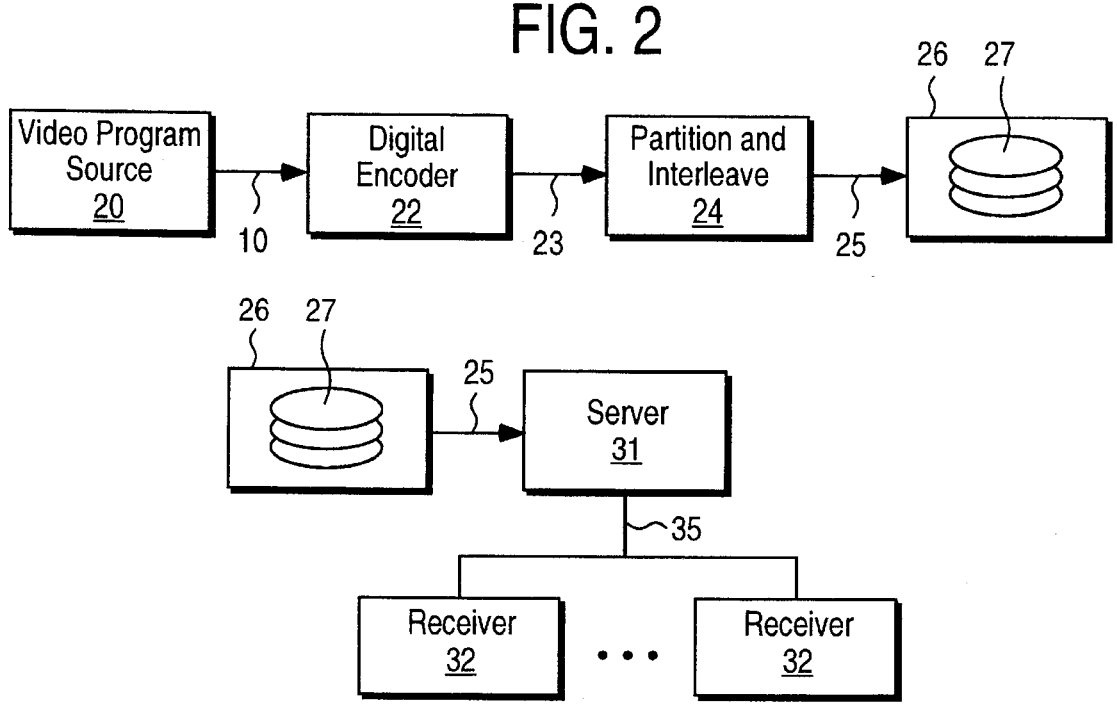
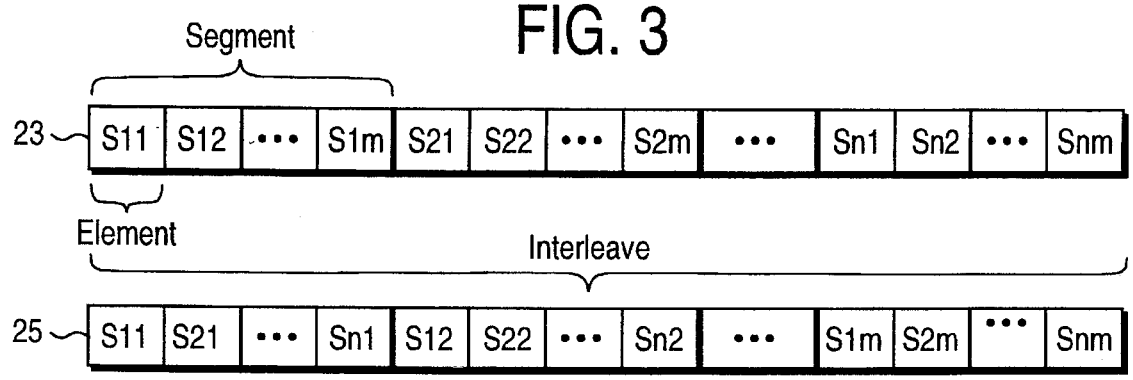
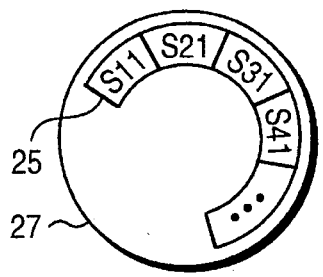

METHOD AND APPARATUS FOR ENCODING AND FORMATTING DATA REPRESENTING A VIDEO PROGRAM TO PROVIDE MULTIPLE OVERLAPPING PRESENTATIONS OF THE VIDEO PROGRAM

BACKGROUND OF THE INVENTION

1. Field of the Invention

The present invention relates to the provision of video programming on-demand, and more particularly to a method and apparatus that encodes, formats, stores and retrieves data representing a video program as a plurality of concurrent, overlapping presentations of the video program to facilitate virtual on-demand access to a single copy of the video program by virtually any number of subscribing viewers.

2. Description of the Related Art

People in the United States spend roughly $7.5 billion annually to rent movies and other pre-recorded video programming for private playback at their convenience. Such video programming can be rented in many forms, such as video cassette tapes for playback using a video cassette recorder (VCR), video disks for playback on video disk players, or as CD ROM's for playback using personal computers and other forms of CD ROM players.

Renting video programming in this manner is desirable because it permits the user to view the programming at any time and in any manner. For example, the user may view some portion of the program at one time and the remainder of the program at some different time. Further, the user may replay certain portions of the program or view the program in its entirety several times. The user may access the program from any point in the program by simply fast-forwarding or reversing through the program. The user is thereby freed from the constraints of available network or cable television programming.

Cable television and direct broadcast satellite (DBS) companies would like to compete in this arena by providing users with the same freedom of use enjoyed through video rental. This service would be known as "video-on-demand." Such companies would clearly enjoy an advantage over video rental establishments in providing such a service because users would not be required to leave the comfort of their own homes to rent a copy of the video program (nor would they have to return it when finished). These companies have been heretofore constrained, however, by existing playback and distribution technology.

It would be prohibitively expensive for a cable television company to provide true video-on-demand using currently known technology. To duplicate the advantages of video rental and in-home playback, the company would have to provide a dedicated playback resource to each cable subscriber, along with an expensive memory array containing a library of video programs from which the subscriber could select programs for playback through the dedicated resource. Further, the cable distribution infrastructure would be required to have sufficient bandwidth to distribute a different video program, or at least a different playback of a video program, to each subscriber connected to the network. Of course this would be impossible without a leap in technology and replacement of the current distribution infrastructure.

One possible compromise would be to produce multiple, overlapping playbacks (i.e. presentations) of the same video program, such that a new presentation of the program would begin, for example, every five minutes. For a two hour video program, a total of twenty-four overlapping presentations of the program would be made available to subscribers. Each subscriber would then have a receiver capable of selectively receiving any one of the twenty-four presentations. Although a subscriber would not enjoy full video-on-demand, the subscriber would have to wait at most five minutes to begin viewing the program in its entirety (or to access any point within the program). Further, the subscriber could fast-forward or reverse through the program by accessing a different one of the overlapping presentations, although he would be constrained to do so over the five minute intervals.

Although such a compromise would decrease both the requisite number of playback resources and the necessary bandwidth, the costs of implementing such a system in currently known technology would still be prohibitive. For the above example, twenty-four playback resources would be required to produce twenty-four separate presentations, each being transmitted over one of a limited number of channels comprising the distribution medium. Further, without sophisticated server technology, such a system might require twenty-four separate copies of the program.

Complex disk-drive arrays or video servers have been recently proposed, each having thousands of video programs stored in their memory and each capable of serving up to two hundred subscribers. The cost of implementing a video-on-demand system for the 57 million current cable subscribers, assuming that such advanced technology could be implemented, would still require an estimated $20 billion in capital investments (about $350.00 per subscriber). Further, full implementation of a service based on such proposed server technology would require that the current cable and telephone distribution network infrastructure be restructured and upgraded over the next several years at a cost of an additional $2 billion per year to increase its bandwidth. Implementing VCR-like functions, such as fast-forward and reverse, would not only increase the complexity of the servers, but it would also impinge on available bandwidth because each subscriber must be able to communicate commands back to his or her dedicated server. Such "back channels" are not even available in the context of existing DBS systems, and most existing cable distribution systems.

The best service that cable television and DBS companies have been able to offer thus far is a pay-perview service that permits users to request (either over the telephone or directly through the cable network) an offered video program for a fee. The company then permits the subscriber to receive the selected transmission of the video program. These services are far from video-on-demand, however, as the number of available programs and the number of starting times for the programs are severely limited. Thus, the subscriber must still wait for a scheduled start time at which a desired program will be transmitted over the distribution network. Further, the subscriber does not have the freedom provided by an in-home playback resource such as a VCR; the program is still just passively received.

Thus, there is a need in the art for technology that can provide virtually an unlimited number of viewers with virtually random access to as few as one copy of a video program through as few as one playback resource and that is operable with the existing telephone and cable distribution infrastructure.

SUMMARY OF THE INVENTION

The present invention provides a method and apparatus for encoding and formatting data representing a single presentation of a video program for storage and for transmission that simulates multiple overlapping presentations of the video program using a single playback resource. Put another way, the video program is transmitted as a digital data stream that has been formatted in such a way that it appears to a subscriber that a number of segments of the same program are being continuously distributed over a plurality of subchannels concurrently. By selecting successive segments for presentation over the receiver (e.g. by advancing the subchannel to which the receiver is tuned), an entire presentation of the video program can be assembled. Further, the subscriber can fast-forward or reverse through the program by advancing or decrementing the selected subchannel and thus receive a later or earlier segment of the program.

Thus, a one-hour program formatted in accordance with the present invention could be made to simulate, for example, twenty overlapping presentations of the program with each presentation (i.e. program segment) being three minutes ahead of the previous one. A subscriber would have to wait only a maximum of three minutes to begin receiving the program in its entirety (i.e. until the segments begin again), and would be able to fast forward or reverse through the program at three-minute intervals. Thus, the maximum delay that a subscriber would have to experience to randomly access any point in the program (i.e. the access time) would be three minutes. The present invention resides in its ability to provide this functionality with a single playback resource producing a single formatted data stream that represents a single presentation of the video program.

It is well-known in the art that a video program can be converted to a digital data stream for purposes of transmitting the program over a digital distribution medium to subscribers. Video programs are typically organized as a series of scenes or frames, each frame comprising a two-dimensional array of picture elements or pixels. Each pixel has characteristics such as color and brightness which can be quantified as binary data. Audio information associated with the video program can also be converted to a binary representation. In accordance with the present invention, the image and audio portions of a video program are converted to digital data streams using known techniques and standards.

It is also well-known that much of the information contained in a video program is redundant (i.e. pixels in certain regions of the pixel matrix may not change over considerable numbers of frames). Further, areas where changes occur rapidly can often tolerate artifacts that result from truncation of data representing pixel characteristics. Accordingly, the binary data generated to represent a video program can often be compressed considerably, thereby minimizing requisite memory storage and transmission bandwidth. Thus, the video data streams are preferably compressed (i.e encoded) using any known video data compression technique to produce compressed video data streams. The binary data comprising these data streams (both before and after compression) are grouped into arbitrary units called elements; an element can refer to one or more bits of video data where video data refers to all data required to represent a video program, compressed or not, and including but not limited to image, audio and other associated information.

The video data streams (compressed or not) are partitioned into n subsequences of elements representing segments of the video program, with each segment comprising an ordered sequence of m elements. The ordered sequence of elements making up each subsequence are interleaved to produce a single interleaved data stream that preferably begins with the first element of each of the n segments, then the second element of each segment and so on in segment order until it ends with the m'th element of the n'th segment. This interleaved data stream is continuously transmitted over the distribution medium from beginning to end.

A subscriber with an appropriate receiver can reconstruct the entire program, starting when the transmission is at the beginning of the interleaved data stream, by sequentially selecting and assembling the m elements of the first segment as the receiver serially parses through the interleaved data stream. The receiver reconverts the selected and assembled elements back into image and/or audio in real time for presentation of the first segment to the subscriber. As transmission of the interleaved data stream begins again, the receiver selects and assembles all of the elements of the second segment for reconstruction, and repeats this process until it completes its n'th pass through the data stream to select and assemble the m elements comprising the n'th segment. The receiver continuously decompresses (i.e. decodes) and reconverts the assembled segments in real time to reconstruct the video program in segment order for viewing by the subscriber.

As long as the rate of transmission of the interleaved data stream is at least "n" times the average data rate "r" of the individual segments, the system will operate properly. Thus, for a given value of r, the throughput of the resource used to transmit the interleaved data stream defines the number of possible segments into which the program may be divided. The viewing time of one of the n segments defines the access time "T" of the system, which is the minimum time interval between accessible points in the program. Further, the time necessary to transmit the entire interleaved data stream once must be less than or equal to T.

Thus, a subscriber receives access to an ordered sequence of n segments of the video program concurrently over n subchannels, which means any number of subscribers can be concurrently reconstructing n overlapping presentations of the video program, each presentation running ahead of its predecessor by an amount of time T required to reconstruct one video segment. The formatting of the data stream representing the video program operates analogously to the process of time-division multiplexing information received from a plurality of communications channels. In the context of communications, however, each channel carries a different conversation or program, whereas the present invention exploits similar principles to break up and transmit a single program over separate subchannels of the same channel. It is this unique application of TDM principles to the context of video-on-demand which forms the basis for the instant invention.

An alternate preferred embodiment of the invention adapts the idea of statistical encoding to the interleaving process so that video segments that require more data to maintain desired picture quality are allocated more data while other segments of the program requiring less data are allocated less data such that the overall allocated bandwidth remains the same. In this embodiment, the video data streams are partitioned into subsequences representative of the segments first and then each subsequence is compressed and interleaved through a statistical multiplexer. This embodiment, although more complex in implementation, provides more uniform picture quality throughout the program.

In the preferred embodiment of the invention, the compression and interleaving processes are performed interactively through a combination of software and hardware, and the resulting encoded and formatted (i.e. interleaved) data stream representing the program is intermediately stored on a disk or some other form of mass storage. The interleaved data stream can then be sequentially retrieved and cyclically transmitted over the distribution medium to subscribers by some relatively simple embodiment of a video server.

It is therefore an objective of the present invention to provide services which approximate video-on-demand to cable television and direct broadcast satellite subscribers while minimizing the requisite playback resources and minimizing the requisite bandwidth to remain compatible with the existing distributional infrastructure.

It is further an objective of the present invention to format a video data stream representative of a single presentation of a video program such that multiple overlapping presentations of the video program can be reconstructed from the repeated transmission of the formatted data stream by a virtually unlimited number of subscribers.

It is still further an objective of the present invention to provide subscribers with the ability to selectively access and reconstruct any one of n segments of the video program such that a subscriber may fast forward or reverse through the program between segments such as with a VCR.

It is still further an objective of the present invention to use statistical techniques in encoding and formatting the data stream to minimize any variation in picture quality throughout the presentation of the video program.

These and other advantages of the present invention will be appreciated in view of the following detailed description and the figures referenced therein.

BRIEF DESCRIPTION OF THE DRAWINGS

FIG. 2 is a block diagram illustrating a first preferred embodiment of the invention.

FIG. 3 is a data structure diagram illustrating an interleaved sequence of elements formed by the system of FIG. 2.

FIG. 4 is a diagram illustrating a possible layout of video data representative of a program as formatted and stored on a mass storage device by the first preferred embodiment of the invention.

DETAILED DESCRIPTION OF THE INVENTION

As previously discussed, one way to closely approximate video-on-demand is to provide subscribers with access to multiple overlapping presentations of the same video program. The greater the number of overlapping presentations available to a subscriber, the more starting times there will be and the closer the approximation to complete random access of the video program. Complete random access might be achieved using this scheme if the number of overlapping presentations is made, for example, equal to the number of frames in the video program. As a practical matter, however, the number of overlapping presentations does not have to be nearly that numerous. As previously discussed, however, even a satisfactory approximation of random access to a video program using this technique would be prohibitively expensive using known or even envisioned technology.

The present invention resides in a unique application of time-division multiplexing principles (TDM) to provide subscribers with continuous access to multiple segments of a video program, thereby facilitating reconstruction of multiple overlapping presentations of the same video program. This functionality is accomplished through the repeated transmission of a single, specially formatted data stream representative of one complete presentation of the video program. The number of overlapping presentations of the video program that can be reconstructed from the formatted data stream, and thus the minimum access time between points in the program, is directly related to the rate at which the data stream can be transmitted over the distribution network as well as the rate at which data must be received by the receiver to permit real-time reconstruction of the video segments at the desired level of picture quality.

The present invention is unique because TDM principles are typically applied where a number of distinct data streams, each representing a different conversation or program, are to be transmitted over the same high-speed trunk such that all of the conversations or programs are simultaneously accessible by a receiver. The present invention, however, applies these principles to transmit n different segments of the same program over n different subchannels of the same channel, thus making each segment of the video program simultaneously accessible to a subscriber's receiver over the same channel of the distribution network. The receiver can therefore be made to reconstruct and present any of the n segments to the subscriber by selecting the subchannel carrying the desired segment.

Figure 1:
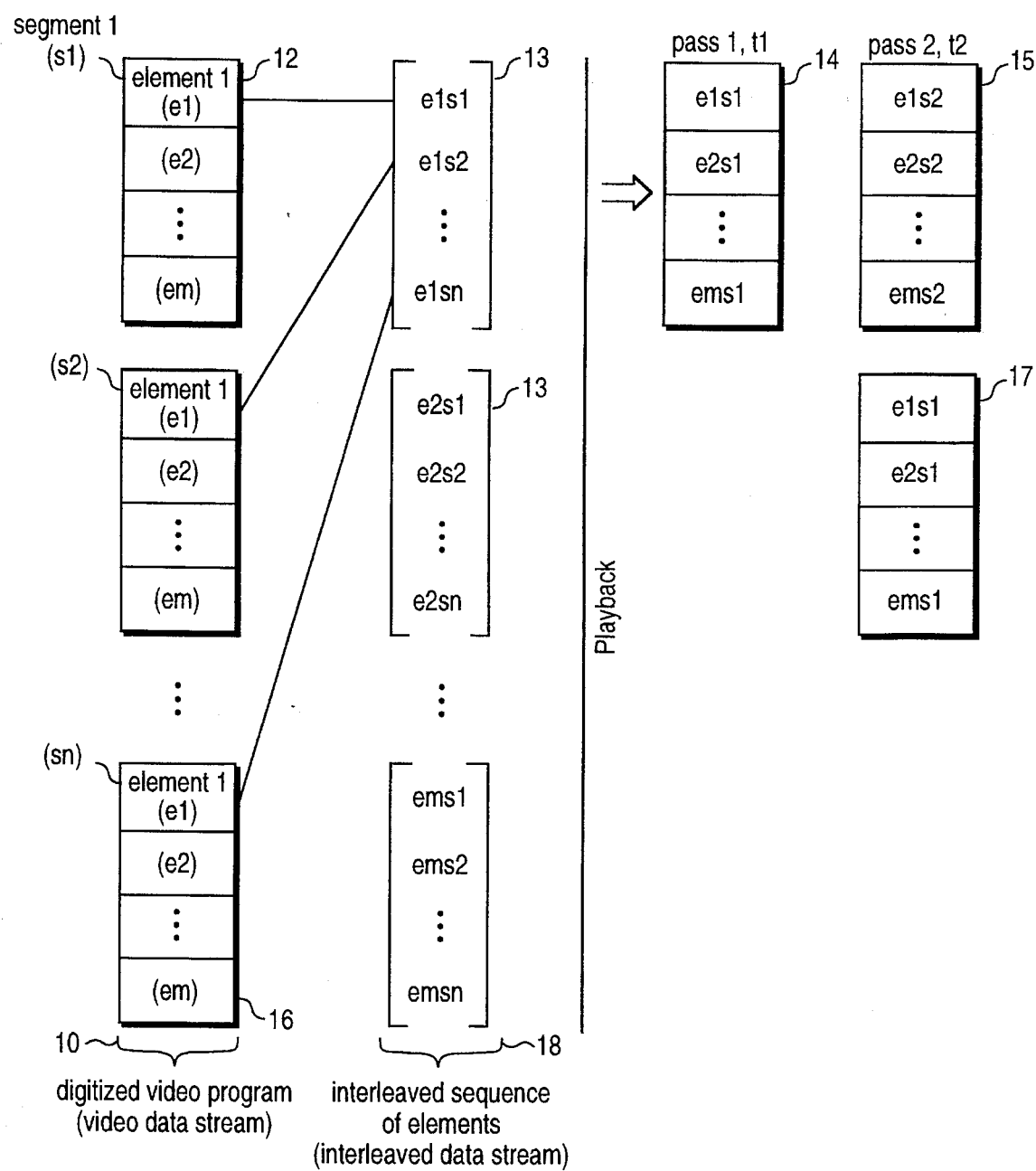
FIG. 1 illustrates the interleaving and de-interleaving of a data stream representative of a video program.

The following detailed description is made with reference to FIGS. 1–9, in which like reference numerals indicate identical elements throughout all of the Figures. FIG. 1 illustrates the essential principles of the instant invention.

A video program is typically organized as an ordered sequence of scenes or frames, with each frame defined by a two-dimensional array of picture elements or pixels. A pixel has characteristics of color and intensity of illumination which, when combined with other pixels, creates an image or frame. For a given frame, the characteristics of each pixel can be represented digitally. Thus, it is well known in the art that a video program can be converted into a digital data stream 10 that is an ordered sequence of bits which describes pixel values for each pixel of the aray during each frame of the video program. It is also known that audio associated with the program can also be converted to digital data, and can be identified with the image data on a frame-by-frame basis.

Thus, a video program is first converted to a digital data stream 10 in accordance with well-known standards and procedures. The data stream 10 can represent images, audio or both, although in the preferred embodiment, separate data streams 10 are produced for the image and audio portions of the program. It will be assumed for ease of discussion and illustration that the data stream 10 throughout the Figures represents the image portion of the video program, although audio data streams can be processed in accordance with the present invention as described for image data.

The data stream 10 is typically organized into an ordered sequence of elements, where as previously defined, an element is an arbitrary quantum of data that can be one bit, the number of bits representative of a single pixel, or the number of bits representative of one or more frames of pixels. In the case of audio, an element can be from one to several bits of audio data.

The video program is then divided into a number of video segments n, of approximately equal duration. Preferably, as many segments as possible given the rate at which the receiver must receive data to present the program in real time, and the maximum transmission rate which the playback and distribution resources are capable of sustaining. The segments are created by partitioning the data stream 10 into n ordered subsequences of m elements, each subsequence representative of one of the n segments of the video program. Thus, the video program, as represented by data stream 10, starts at the beginning of the sequence of elements (i.e., the first element of segment 1 as denoted by reference numeral 12), and ends with the last element of segment n (i.e., denoted by reference numeral 16).

In the preferred embodiment, the elements of each segment are interleaved to produce an interleaved sequence of elements called an interleaved data stream 18 as shown in FIG. 1. The interleaved data stream is constructed by arranging into frames identically numbered elements of each segment in segment order, beginning with the first element of each segment, and ending with the m'th element of each segment.

Thus, the n video segments which make up the video program are essentially time-division multiplexed over n "subchannels" of the channel over which the video program is broadcast. The interleaved data stream 18 is organized into a series of m "frames" 13, with each frame partitioned into n "time slots" in segment order (i.e. one time slot is assigned to each segment). During each frame, one element belonging to each segment is transmitted during the time slot assigned to that segment.

The interleaved data stream 18 is repeatedly transmitted over a single channel of the television cable to subscribers. Provided that the transmission rate of the interleaved data stream 18 is at least n times the average data rate r of the individual segments, it will appear as though all n segments of the program are available to the receiver simultaneously. Each new transmission of the interleaved data stream 18 provides a subscriber an opportunity to begin restoration of the video program from its beginning, or to continue restoration of the program initiated during previous transmissions of the interleaved data stream.

The subscriber can view the program from its very beginning by simply programming the receiver to select and reconstruct elements associated with segment 1 (i.e. the first "subchannel") when transmission of the interleaved data stream is at the beginning of the interleaved data stream 18 (i.e at time t1). As the interleaved data stream 18 is transmitted, the subscriber's receiver selects and assembles (i.e. de-interleaves or demultiplexes) the elements which form the first segment 14. Concurrently, the receiver converts the elements comprising segment 1 into a presentation of the segment for viewing by the subscriber. From the beginning of the next transmission of (or pass through) the interleaved data stream 18 (i.e. at time t2), the receiver is altered (i.e. is tuned) to the next subchannel to select and assemble the elements representative of the second segment 15. Meanwhile, another subscriber can simultaneously begin accessing the program by selecting and assembling data representing the first (or any other) segment 17. This process continues for the first subscriber until the receiver has received and reconstructed all n segments of the video program, or until the subscriber manually alters the subchannel to which the receiver is tuned. Reconstruction will continue from the newly selected segment.

Thus, virtually any number of subscribers can simultaneously access any of the n segments, all of which are accessible from the transmission of a single data stream representative of a single presentation of the video program. Accordingly, the invention achieves the significantly important result of providing multiple subscribers virtually random access to a video program while minimizing the storage and distribution infrastructure necessary to provide this access.

As previously discussed, a subscriber can begin accessing and reconstructing the program from any segment, even at a time when the transmission is currently in the middle of the interleaved data stream 18 and therefore in the middle of each of the n segments. A subscriber can fast forward or reverse through the program by advancing or decrementing the segment currently being selected by the subscriber's receiver. Such steps forward or backward in the program are, however, constrained to multiples of the access time T. The granularity of access points in the video program is a direct function of the number of video segments into which the video program has been divided. The greater the number of video segments n, the shorter their duration and thus the finer the steps between them. Thus, n is referred to as the "interleaving factor." As previously discussed, the number of video segments into which a program can be divided is limited by the bandwidth available for transmitting the n interleaved segments and the maximum data rate that can be sustained by the playback resource.

One way to reduce the data rate that must be sustained by the playback resource for a given interleaving factor is to reduce the total amount of data necessary to adequately represent the video program. Well-known techniques in the art can be used to encode the data stream 10 of FIG. 1 to compress the amount of data necessary to adequately represent the program. Two examples of well-known digital compression standards for video data are the MPEG-1 and MPEG-2 standards for Generic Coding of Moving Pictures and Associated Audio. The ITU-T (International Telecommunications Union Telecommunications Standardization Sector) Draft Recommendation H. 262 (10:18 Friday 25 Mar. 1994) is incorporated herein by this reference. A further benefit of data compression is that the amount of storage space necessary to store interleaved data streams 18 representative of video programs for later transmission is also reduced.

A first preferred embodiment of the present invention will be described which compresses the video data stream 10 and then interleaves the resulting compressed data elements. A second preferred embodiment employs the principles of statistical multiplexing to statistically encode and interleave the video data stream 10 to ensure a more uniform picture quality for the reconstructed video program as viewed by a subscriber. Nonstatistical encoding and interleaving may be simpler to implement with existing encoder and decoder products and can be easily applied to independently compressed video data streams. Statistical encoding and interleaving may result in significantly improved uniformity of picture quality, but may require more sophisticated encoding structures than non-statistical encoding and interleaving.

1. First Preferred Embodiment: Non-Statistical Encoding and Interleaving

FIG. 2 illustrates a first embodiment for performing nonstatistical encoding and interleaving according to the invention. In FIG. 2, a video program source 20 provides a data stream 10 that represents, for example, the image portion of the video program. The data stream 10, which is typically an ordered sequence of digital data representing pixels embodying the images of the video program, is compressed by a digital encoder 22, employing any well-known procedure for compressing digitized video data. The digital encoder 22 produces a compressed video data stream 23 that is organized as an ordered sequence of elements of compressed data representing the video program as embodied in the data stream 10. In the preferred embodiment, the elements are made up of equal numbers of bits which may not be organized based on pixel boundaries.

The compressed video data stream 23 is then partitioned into n multi-element subsequences of elements, each representative of one of n video segments. The elements of the n subsequences are then interleaved by a partition and interleaving circuit 24 in accordance with the method of the invention as previously described. The partition and interleaving circuit 24 produces an interleaved data stream 25 that can be directly transmitted to subscribers or that can be stored on a mass data storage medium 27 by data storage unit 26 for future retrieval and transmission. Data storage medium 27 may consist of one or more hard disk, optical, tape, or electronic memory devices.

In a preferred embodiment of the invention, the interleaved data stream 25 will typically be stored on data storage device 27 for future playbacks of the video program embodied in the interleaved data stream 25. The data storage device 27 is placed in a system that provides on-demand video programming including a server 31, and a plurality of receivers 32, 34 that are coupled to the server 31 by an appropriate distribution network 35. The server repeatedly transmits the interleaved sequence of elements stored on the data storage device 27 to all receivers on the distribution network 35. Each of the receivers 32, 34 includes the processing capacity necessary to reconstruct the video program in the manner described above by selecting, for each video segment, the sequence of elements comprising that segment. In this regard, each receiver includes the processing capacity to de-interleave the interleaved data stream 25, to reassemble and decode the resulting compressed data stream and to reconvert the resulting decompressed data stream 10 back into the sequence of pixels that embodies the images of the video program.

FIG. 3 illustrates the partitioning of the compressed data stream 23 into subsequences representing the video segments. As the sequence of elements is encoded (i.e. compressed) by the digital encoder 22, the resulting compressed data stream 23 is produced as illustrated in FIG. 2. The compressed data stream 23 is then partitioned by the partition and interleaving circuit 24 into n ordered subsubsequences of elements each representative of one of n video segments. Each subsequence is further partitioned into m elements so that the total number of video program elements is n·m, and each element is denoted by Sij, where $1 \leq i \leq n$ and $1 \leq j \leq m$. As FIG. 3 illustrates, partitioning renders the compressed data stream 23 into an ordered sequence of n subsequences, each subsequence including one or more elements, each element including one or more bits of compressed video data. FIG. 3 also illustrates the interleaved data stream 25 which results from the interleaving process. FIG. 4 illustrates the storage of the interleaved sequence of elements comprising the interleaved data stream 25 on data storage device 27.

Referring once again to the interleaved data stream 25 shown in FIGS. 3 and 4, and to the combination for storage and formatting illustrated in FIG. 2, it should be evident that one or more data storage devices 27 can be employed to store the interleaved data stream 25. The required number of data storage devices may be determined by design considerations taking into account the size of the compressed bit stream 23, the interleaving factor n, and the access speed and capacity of individual data storage devices. Assuming that the data storage device is a hard disk drive, the interleaved sequence 25 can be split into different, but equally-sized sections, and each section can be recorded onto one of $N_d$ different hard disks. The capacity of each data storage device 27 is assumed to be sufficient to contain $nm/N_d$ elements. A more detailed discussion of those considerations will be presented below.

Figure 5:
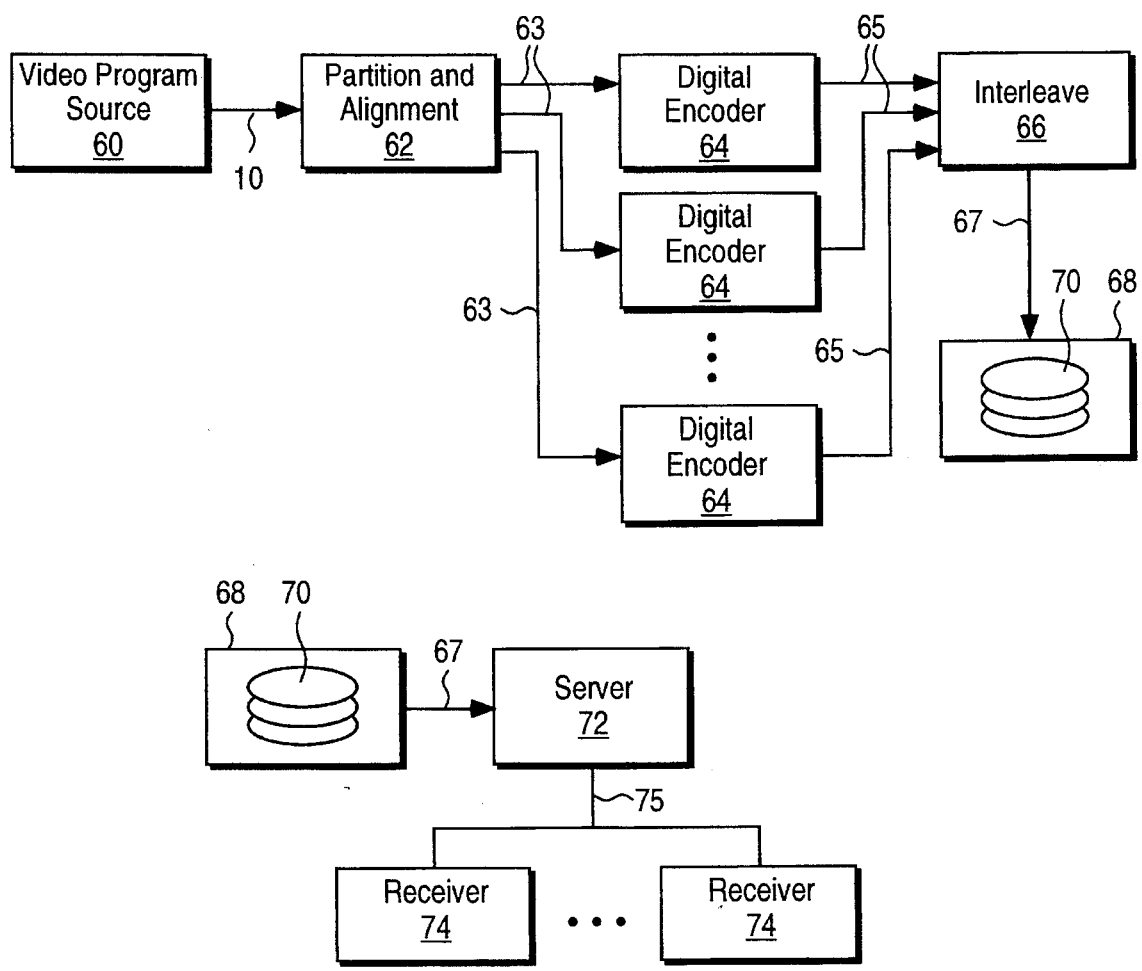
FIG. 5 is a block diagram illustrating a second preferred embodiment of the invention that employs statistical encoding and interleaving.

2. Second Preferred Embodiment of the Invention: Statistical Encoding and Interleaving FIG. 5 illustrates a second preferred embodiment of the invention which performs statistical encoding and interleaving. A video program source 60 provides a data stream 10 representative of a sequence of pixels that embodies the image portion of the video program. The data stream 10 is organized as an ordered sequence of elements, each element comprising data representing an equal number of pixels. The video program is partitioned into n segments, with each video segment represented by a subsequence of data stream 10, each subsequence representative of an equal number of pixels.

The n subsequences representative of the n video segments are aligned in time by the partition and alignment circuit 62 and each subsequence is concurrently provided on a signal line 63 to a respective digital encoder 64. Each digital encoder converts its respective subsequence into a compressed subsequence of elements, each element consisting of one or more bits of compressed video data. Elements of the compressed video data stream 65 are interleaved by an interleaving circuit 66 to produce an interleaved data stream 67. In the preferred embodiment, a data storage unit 68 receives the interleaved data stream 67 and transfers it to a data storage device 70 for later retrieval and transmission. As previously discussed, the interleaved data stream 67 can also be transmitted immediately to subscribers over a distribution network in realtime.

For playback of the video program embodied in the interleaved sequence of elements 67, the data storage device 70 is placed in a system that provides on-demand video programming. The system preferably includes a server 72, and a plurality of receivers 73, 74 that are coupled to the server 72 by an appropriate distribution network 75. The server repeatedly transmits the interleaved data stream 67 stored on the data storage device 70 to all receivers connected to the distribution network 75. The interleaved data stream 67 is repeatedly transmitted to all receivers. Each of the receivers 73, 74 includes the processing capacity necessary to reconstruct the video program by selecting and assembling, for each video segment, the subsequence of elements representative of the segment. In this regard, each receiver includes the processing capacity to de-interleave (i.e. demultiplex) the interleaved data stream 67 to thereby reproduce compressed data stream 65, to decode compressed data stream 65 into data stream 10, and to convert the data stream 10 to the sequence of pixels that embody the video program.

Figure 6:
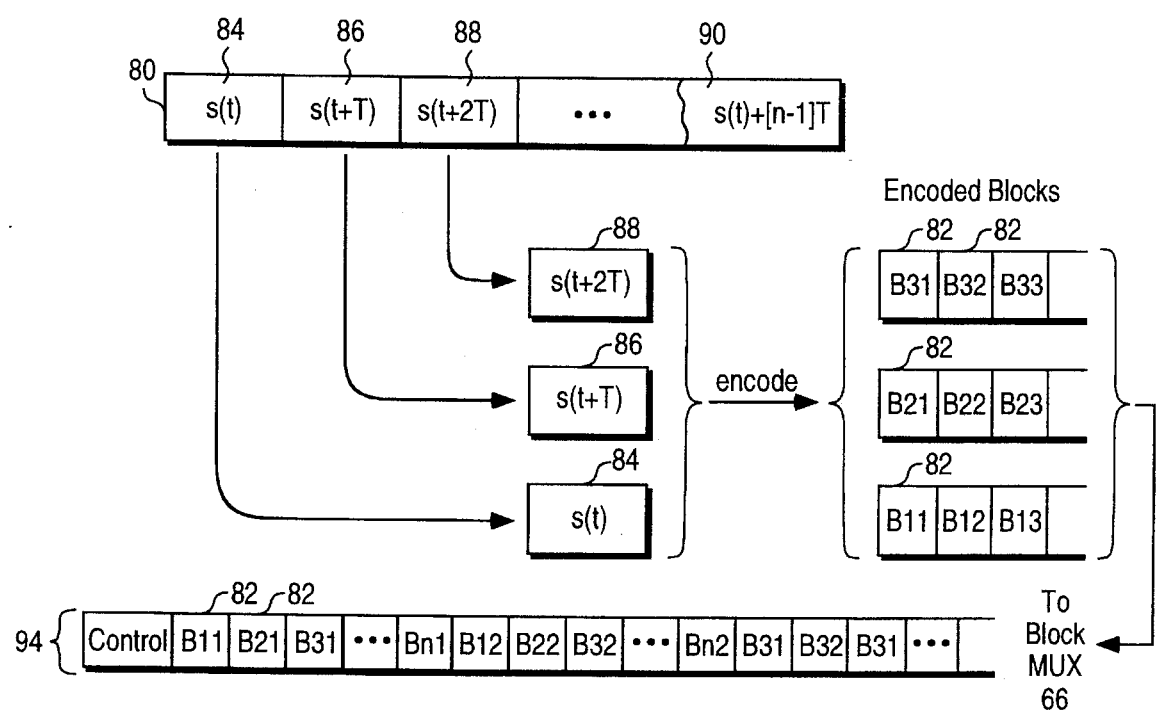
FIG. 6 is a diagram illustrating the statistical encoding and interleaving of video data according to the second preferred embodiment of the invention.
Figure 7:
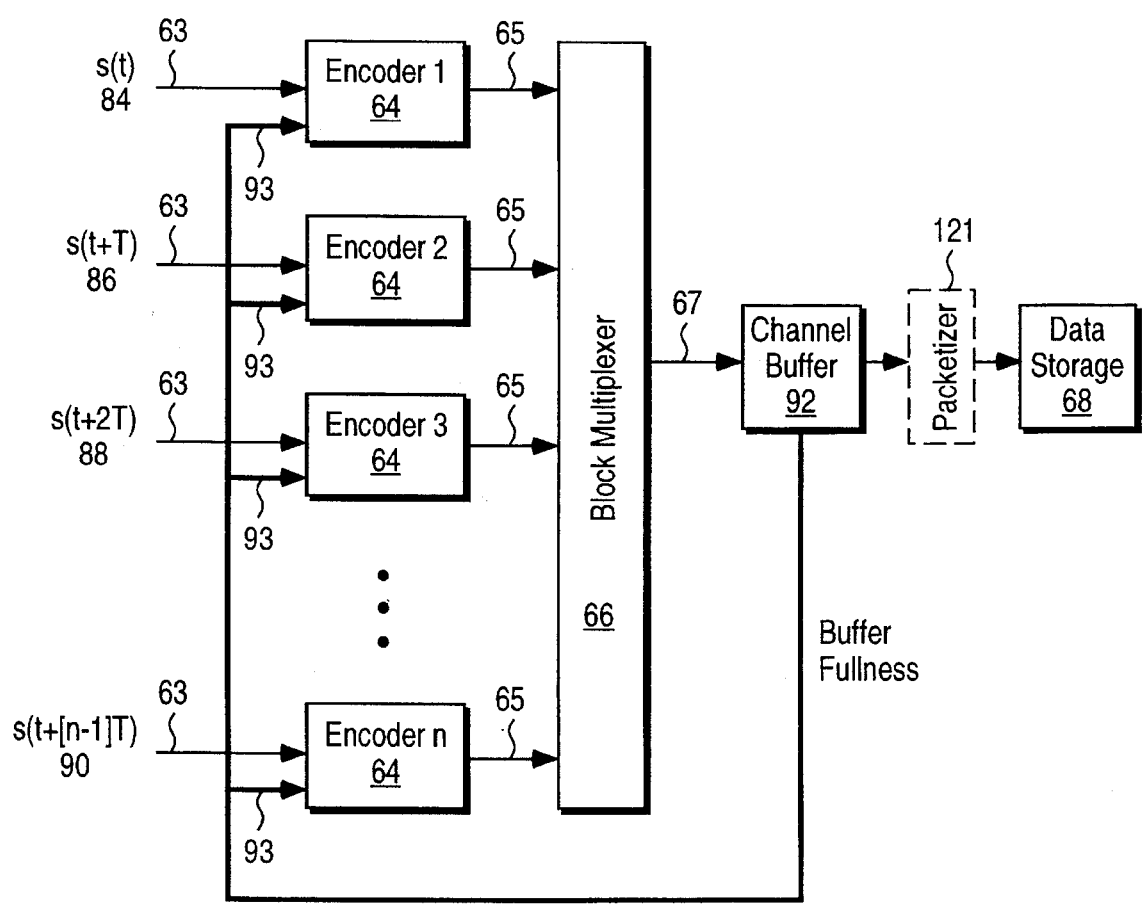
FIG. 7 illustrates, in more detail, the statistical encoding and interleaving process as performed by the second preferred embodiment of the invention.

A more detailed discussion of the statistical encoding and interleaving process performed by the combination illustrated in FIG. 5 is now presented with reference to FIGS. 6 and 7. The data stream 10, which is a digitized representation of the sequence of pixels embodying the images of the video program, is partitioned into n subsequences of elements representative of n video segments. Each element of the subsequence consists of data that represents the same number of pixels. Each subsequence has an equal number of elements and therefore represents the same number of total pixels.

Each pixel of the subsequence representing the first segment 84 of partitioned data stream 80 has a video intensity value $s(t)$, where each pixel is defined by its position in the subsequence as a function of time. Because the duration of a segment is defined to be T, the video intensity value for each pixel of the second subsequence representing the second segment 86 is defined by $s(t+T)$, and for all pixels is defined by $s(t+i \cdot T)$ were $0 \leq i < n$. Each of the subsequences of partitioned data stream 80 are then separately assembled and input to their respective decoders simultaneously as shown in FIGS. 6 and 7. Thus, the segments are time shifted for purposes of concurrent processing.

Figure 8:
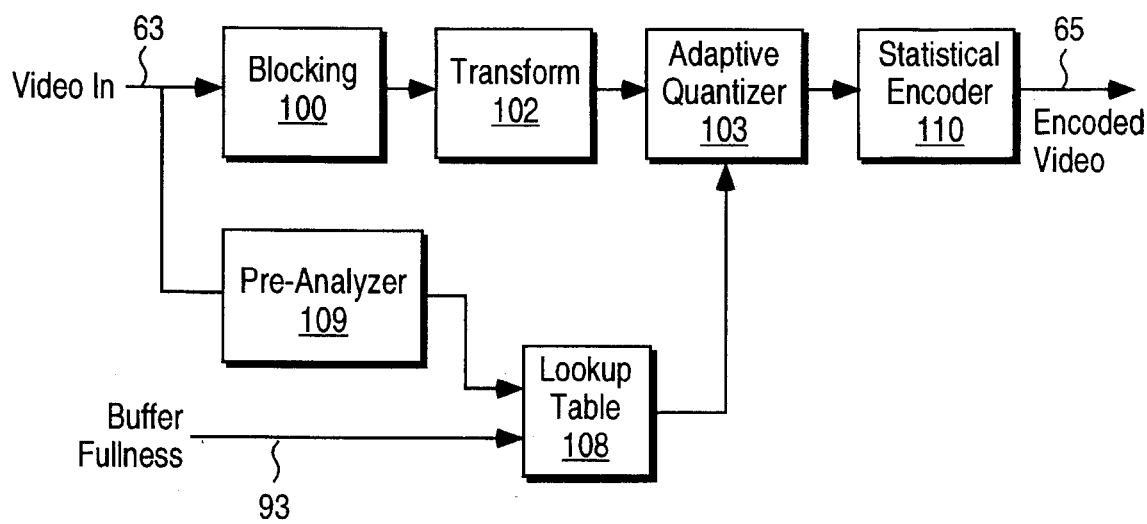
FIG. 8 is a block diagram showing an encoder of the second preferred embodiment of the invention in greater detail.

Each encoder 64 of FIG. 7 processes its own subsequence of digital pixel data and the preferred embodiment of such an encoder is shown in more detail in FIG. 8. Such encoders are well known in the art and the details of the encoder disclosed are not relied on for patentability of the invention. Those of skill in the art will recognize that any encoder suitable for compressing video data within the context of the prevent invention can be substituted therefor.

As illustrated in FIG. 6, each encoder compresses the data comprising its respective subsequence of pixels, producing a sequence of elements consisting of compressed data called blocks 82. The encoder performs this function by first organizing its subsequence of pixel data into elements called blocks with a blocking circuit 100 (FIG. 8). Each block consists of data representing an equal number of pixels. Each block represents some subset of the total number of pixels embodying the segment. A block can consist of data representing all of the pixels that make up a single frame or image of the segment. As an example, a frame may contain 480 lines of 720 pixels, or 345,600 pixels total. Blocks can arbitrarily consist of pixels making up fractions of frames, single frames or even multiples of frames.

Each element or block of pixel data is then processed through a transform circuit 102, which uses well-known compression transforms, such as the discrete cosine transform (DCT) to convert the binary pixel data to transform coefficients. The coefficients are quantized or normalized by adaptive quantizer 103, which improves coding efficiency by truncating the coefficients in accordance with the desired level of picture quality to be produced when the information is decompressed for presentation. Finally, the quantized coefficients are passed through a statistical encoder 110 which further compresses the data based on a variable length encoding technique such as Huffman coding.

Each of the encoders is synchronized so that each produces a block of compressed data simultaneously, and each encoder is preset to a coding level that reflects the desired quality level of the reproduced picture. Each compressed block (i.e. element) of data produced by an encoder, although still representative of an equal number of pixels, may vary in its amount of binary data because some blocks of digital pixel data will compress more easily than others. Block multiplexer 66 (FIG. 7) then interleaves the blocks by selecting a block from the first encoder (and thus from the first segment), then the second and so on, up to encoder n, and then repeats the process for the next set of compressed blocks. Thus, an interleaved data stream 94 is produced as shown in FIG. 6, with each block 82 designated first by a segment number and then by block (i.e. element) number.

The interleaved data stream 94 is then input to a first-in-first-out (FIFO) channel buffer 92 (FIG. 7) and clocked out of the buffer at the transmission rate necessary for proper operation (i.e. n·r). If the buffer begins to fill up, a signal is provided over line 93 (FIG. 7) which instructs each of the adaptive quantizers 103 (FIG. 8) in each of the encoders 64 (FIG. 7) to increase the coding level which will increase the compression ratio (i.e. be less accurate with respect to the coefficient values) until the buffer starts to empty out. Likewise, if the buffer becomes too empty, the channel buffer 92 can instruct the adaptive quantizers over signal line 93 to decrease the coding level which will decrease the compression ratio.

If the number of segments "n" and the channel buffer 92 are sufficiently large, then it is statistically probable that the number of data intensive compressed blocks (i.e. those blocks which were difficult to compress) will balance out with those compressed blocks containing less information (i.e. those blocks which were more easily compressed) over any window of time. Thus, the picture quality should be reasonably consistent throughout the video program and the number of changes in the compression ratio during encoding and interleaving should be minimal.

An example of this encoding technique as applied to multiple programs being multiplexed over a multichannel trunk is disclosed in U.S. Pat. No. 5,216,503 to Paik et al., which is incorporated herein by this reference. In Paik et al., this technique is applied to ensure that the sum of the data transmitted at any time over all of the channels of a trunk does not exceed the total bandwidth of the trunk. Application of this technique to the instant invention is unique because it is applied to segments of the same program to achieve uniform picture quality during playback of the single program.

The same encoder that is illustrated in FIG. 8 can also be used in a nonstatistical encoding combination as in the first embodiment. In this case, each of the "n" encoders of FIG. 7 could maintain an independent channel buffer, and the compression ratio of each individual encoder would be adjusted in order to maintain a pre-assigned fraction of the total throughput. The disadvantage of the nonstatistical system is that the encoders will tend to deliver unnecessarily high picture quality at times when the video program is easily compressed, and poor picture quality during certain complex scenes when compression becomes difficult.

3. Additional Implementation Details Common to Both Preferred Embodiments

The application of video compression does not necessitate real-time digital encoding as implied in the first and second embodiments, nor does it require multiple encoders. Another preferred way of interleaving and compressing a data stream 10 representative of a video program to take advantage of the statistical variations in the video program is to iteratively compress and interleave the video program using an algorithm that is wholly or partly implemented in software and uses multiple encoding passes through the video program. The algorithm can more efficiently compress the video program by tuning the compression algorithm during each iteration.

An encoding process implemented in software may use a video compression standard such as the one implemented by the encoder of FIG. 8. For the first embodiment, the software compresses the data stream 10 in accordance with a desired quantization level, and then measures the total amount of data that results. If the amount of data exceeds that which can be transmitted within the specified bandwidth, the quantization level is increased and the data stream 10 is compressed again. This process continues until the resulting compressed data stream falls within the requisite bandwidth. The software then partitions the compressed data stream and interleaves the elements of the segments of the partitioned subsequences to produce an interleaved data stream representative of the video program.

Iterative compression through software is particularly advantageous when statistically encoding and interleaving because it does not require the use of costly hardware to split the ordered sequence of pixels represented by the data stream 10 into video segments, nor does it require multiple encoders to simultaneously compress each video segment. Rather, the data stream 10 is first partitioned into subsequences of elements representing segments with the same number of pixels. The partitioned data stream is then compressed in accordance with a specified encoding level using a standard such as the one implemented by the encoder of FIG. 8. The software then interleaves the compressed elements of the subsequences in accordance with the invention. As the software interleaves the elements, it sums the total amount of data across the segments within a certain window, much like the channel buffer 92 of FIG. 7. Any sections of the interleaved data stream for which the amount of data exceeds the specified bandwidth over the defined window are compressed again using a higher coding level. For any sections which exceed some minimum amount of data, the program can recompress the section using a lower coding level.

One way to save some computer time would be to use a hardware encoder such as the one shown in FIG. 8 to compress the data stream 10 at a number of different coding levels and to store the different compressed versions. The software can perform the steps of interleaving and summing, and for any section of the interleaved data stream that is detected to be sufficiently over or under the specified bandwidth, the software can simply replace that section with a section of one of the stored interleaved data streams that has been compressed at the appropriate level of quantization.

During each transmission of the interleaved data stream, a receiver must be able to identify the elements of the particular video segment to be accessed, reconstructed and displayed. One possible implementation by which this can be accomplished is by inserting video segment identifiers into the interleaved sequence of elements as they are being stored for future transmission. For example, sequence numbers (i.e., subchannels) ranging from 1 to n can be assigned to video segments 1 to n respectively. The appropriate sequence number can then be associated with the video data comprising each element prior to interleaving and storage. Thus, as a receiver begins to reconstruct a video program from its beginning, the receiver selects and assembles each element having a sequence number of 1 during the first pass, followed by the elements having a sequence number of 2 during the second pass and so on. The reconstruction process is complete when all of the elements having a sequence number of "n" are selected during the final pass. Of course, a subscriber could program the receiver to jump ahead or backward in the program by manually programming the selected sequence number (i.e., by changing the subchannel).

Another possible implementation is to program the playback resource to insert the video segment identification information into the interleaved sequence of elements as they are being transmitted to the receivers. For example, the same sequence numbers ranging from 1 to n can be initially assigned to video segments 1 to n respectively for a first transmission. At the beginning of the next pass through the interleaved data stream, the playback resource will decrement each segment's assigned sequence number such that segment number two currently has sequence number one assigned to it, while segment one currently has sequence number "n" assigned to it. Therefore, once the receiver begins to reconstruct the video program based on a particular subchannel or sequence number, it can remain tuned to that number throughout the entire reconstruction.

One disadvantage of this implementation is that the first segment, which always represents the beginning of the video program, is no longer associated with a single sequence number. Therefore, the playback resource must insert additional information into the interleaved data stream prior to its transmission to demarcate the first segment of the video program.

Another possible implementation would be to demultiplex the elements at the receiver (i.e. 32, FIG. 2 or 74 FIG. 5) synchronously, with each time slot in a frame assigned to a particular segment of the program.

As previously discussed, the receiver (i.e. 32, FIG. 2 or 74 FIG. 5) also must be able to decode the compressed data and display the right pixels in the right sequence and at the right time. In the case of audio data, the receiver must also be able to synchronize the audio with the images. Finally, the receiver must know what the coding level of the compressed data is at all times. As previously discussed, there are a number of well-known standards for representing video data digitally as well as compressing it that specify how such information be provided in the data stream.

For example, the interleaved sequence of blocks comprising the interleaved data stream 94 (FIG. 6) as generated by the second embodiment combination shown in FIGS. 6, 7, and 8 may be packetized by a packet encoder 121 (shown in FIG. 7). As an example, the interleaved sequence of blocks 94 may be divided into groups of packets, with each packet in the group containing compressed video data representing pixel values for the same sequence of pixels during each of the n segments. Put another way, each packet might be comprised of a block from each segment, each block containing the pixel values s(t) for corresponding pixels of frames occurring at time t, t+T, t+2T ... t+(n−1)T.

Figure 9:
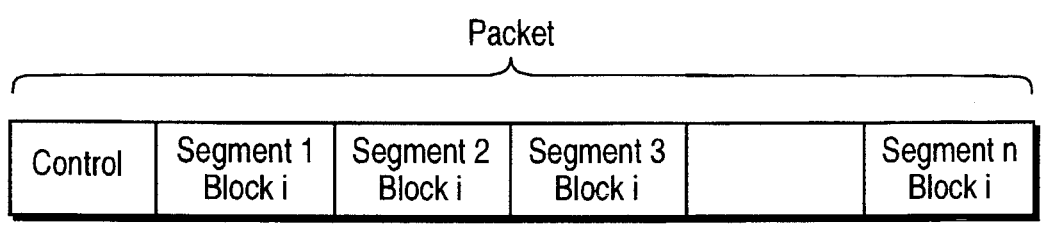
FIG. 9 is block diagram illustrating a possible layout for mass storage of a sequence of elements as statistically encoded and formatted by the second embodiment of the invention.

A single packet may be organized as shown in FIG. 9. It should be noted that, in the preferred embodiment, the size of a packet may vary because some blocks of video may be more difficult to compress than others. Other information included in a packet might be that which defines packet and block boundaries, as well as the coding level of the data in the packet.

Another way of organizing the data is to create packets of data during the interleaving process, such that each packet contains some arbitrary amount of data from a single subsequence representing a segment, which may or may not be on block boundaries. The packets are interleaved rather than the blocks, and information defining the segment, the particular pixels represented by the data and a time stamp which defines a display time for the pixels defined by the data in the packet are included as a header. In this case, the order of interleaving is determined by increasing time stamp value instead of by segment number.

As previously discussed, the required amount of storage and the necessary throughput of the storage device for playback of a video program depends on several design parameters. One of the most important parameters to be specified is the access time "T", which is the time duration of each video segment as it is reconstructed by a receiver for viewing by a subscriber. This parameter defines the maximum delay that a subscriber must endure when the subscriber randomly accesses the program for playback from its beginning.

Playback is a real-time process involving continuous retrieval and transmission of the same interleaved video data stream, and the continuous reconstruction of a video program from that interleaved data stream. Because all n video segments are presented for access by a receiver simultaneously, it follows that any of the n video segments can be accessed at any time during playback. Playback of all video segments begins at the same time and completes at the same time. Thus, the access time T also defines the maximum delay that will be endured to access any point in the video program. Stated differently, it defines the minimum interval of time over which the program can be randomly accessed.

Another parameter to be specified is the average data rate "r" of the compressed video segments of the video program. This parameter defines the rate at which segment data must be received by a receiver so that it can reconstruct the video program in real-time at the desired level of quality. The data rate "r" is determined by the initial image resolution and frame rate of the video program and by the compression ratio that was applied during its encoding. It is expected that most applications of this invention will not require better than VHS picture quality and it is reasonable to assume that this can be achieved if r=1.5 Mbits/second. If statistical multiplexing is used, then the data rate of each compressed video segment will vary because some data segments will compress more easily than others. As previously discussed, however, the cumulative data rates of all n segments will tend to be relatively constant from one program to the next.

For a receiver to have simultaneous access to each segment, the rate at which the interleaved data stream is transmitted over the distribution must be equal to the number of segments n times the average data rate of one segment r (i.e. n·r). Thus, the distribution system and the storage facility from which the interleaved data program is to be retrieved (or the encoding and interleaving apparatus used to generate the interleaved data stream if interim storage is not used), must be able to sustain this data rate. One of the advantages of the present invention is that the cylinders and tracks of a hard disk can be accessed sequentially or in any sequence which maximizes the throughput performance of the unit. Sequential access is made possible by the fact that the playback process accesses, retrieves and transmits the same interleaved sequence of elements over and over.

Thus, there is no random access requirement imposed on the interim storage unit. Assuming that a particular disk drive device can sustain a data rate of 30 Mbits/second, if r=1.5 Mbits/second, then n cannot exceed 20. As previously defined, the total duration of the video program is n·T. Assuming that the video program is two hours in duration, the duration T of each segment is 6 minutes. The storage capacity required for 120 minutes of video compressed to an average data rate of r=1.5 Mbits/second is therefore, 1.35 GBytes.

In addition to compressing the data and maximizing the data rate of interim storage, the minimum access interval may be further reduced by splitting the interleaved data stream into equal portions, storing the portions on separate disks, and then accessing each disk concurrently to retrieve and transmit each portion of the interleaved data stream simultaneously. Effectively, each video segment has been subdivided into equal portions, with each portion of each segment made available to a receiver simultaneously over a different communications channel.

For example, suppose that the interleaved data stream representative of the two-hour program of the previous example is divided into three equal portions, with each portion stored on a separate disk. If the portions from each disk are retrieved and transmitted simultaneously over three separate channels, then the first one-third of each segment will be available on a different subchannel of the first channel, the second one-third of each segment will be available on a different subchannel of the second channel, and the third one-third of each segment will be available on a different subchannel of the third channel. The access interval is thereby reduced from T=6 minutes to $T_d$=2 minutes, where $T_d=T/N_d$ ($N_d$=the number of disks). The minimum capacity of each disk is likewise reduced to 40 minutes of video compressed to an average data rate of r=1.5 Mbits/second, or 450 MBytes.

It will be appreciated by those of skill in the art that multiple disks also may be used in the event that the total data comprising the interleaved data stream exceeds the storage capacity of a single storage device such as a disk, or if the required throughput of the single storage device is not sufficient to meet that specified by n·r.

Two preferred methods of partitioning the interleaved sequence of blocks for writing on multiple disks are now described. The purpose of these methods is to create overlapping data streams from each disk that remain relatively constant in time relative to one another. Those of skill in the art will appreciate that there are many possible schemes for partitioning the data which are contemplated to be within the scope of the present invention.

One partitioning method is to split a packetized interleaved sequence of elements at packet boundaries such that the same number of packets are written to each disk. For example, if each packet contains data that is representative of a fixed number of pixels, then the first K packets may be allocated to a first disk, the next K packets to a second disk, and so on, until finally the last K packets are assigned to the last disk. The total number of packets must be equal to the product of K and the number of disks. This partitioning method may be referred to as the "constant pixels" method, because all of the disks contain video data that is representative of the same number of pixels.

A second preferred method of splitting the packetized interleaved sequence of blocks for writing on multiple disks may be termed the "constant bits" method. For the constant bits method, the same amount of compressed video data is allocated to each disk. The interleaved sequence of blocks 94 is divided into equal sections, one for each disk, but the partitioning is not constrained to occur at a packet boundary. If the total amount of video data in the interleaved data stream is not evenly divisible by the number of disks to be used, then the sequence may be extended by inserting fill data at the end or at certain points where they will not affect the decoding process.

Clearly, other embodiments and modifications of the present invention will occur readily to those of ordinary skill in the art in view of these teachings. For example, encoders based on other known compression techniques may be substituted for that disclosed in the preferred embodiment. In addition, the interleaved data stream could be generated and transmitted in real time without need for intermediate storage. The elements of the interleaved data stream can be any arbitrary amount of data, the boundaries of which can be defined by any number of predefined standards. Therefore, this invention is to be limited only by the following claims, which include all such embodiments and modifications.

What is claimed is:

1. A method of providing concurrent access to an ordered sequence of a plurality of n segments wherein each of the n segments corresponds to a different temporal portion of the same video program, said method comprising the steps of:

partitioning a data stream comprising an ordered sequence of data representative of the video program into n subsequences, each of the n subsequences comprising a portion of the data stream representative of one of the n segments, the data of each of the n subsequences organized as an ordered sequence of elements, at least two of the elements in at least one of the subsequences corresponding to different temporal portions of the video program; and interleaving the elements of the n subsequences to produce an interleaved data stream.

2. The method of claim 1 comprising the additional step of compressing the video program, and wherein the elements of each of the n subsequences comprise compressed data.

3. The method of claim 2 wherein said interleaving step is performed by sorting the elements of the n subsequences according to the order in which they would be decoded by respective receivers.

4. The method of claim 3 wherein the ordered sequence of elements of each of the n subsequences comprises a plurality of m elements.

5. The method of claim 4 wherein each of the m elements comprises an equal amount of compressed data.

6. The method of claim 5 wherein said interleaving step further comprises the step of grouping the first elements of each of the n subsequences together in segment order, then likewise grouping the second through mth elements of each of the n subsequences.

7. The method of claim 1, 3 or 6 further comprising the step of repeatedly transmitting the interleaved data stream over a video program distribution medium for a predetermined period of time.

8. The method of claim 1, 3 or 6 further comprising the step of storing the interleaved data stream on a storage device.

9. The method of claim 8 further comprising the steps of:

retrieving the interleaved data stream from the storage device;

transmitting the retrieved interleaved data stream over a video program distribution medium; and repeating said retrieving and transmitting steps continuously for a predetermined period of time.

10. The method of claim 9 wherein a receiver must receive the ordered sequence of elements of one of the n subsequences at a rate r to present the segment represented by the one of the n subsequences to a viewer in real time without interruption, and wherein said step of transmitting the interleaved data stream is performed at rate equal to or greater than the product of n and r.

11. The method of claim 7 wherein a receiver must receive the ordered sequence of elements of one of the n subsequences at a rate r to present the segment represented by the one of the n subsequences to a viewer in real time without interruption, and wherein said step of repeatedly transmitting is performed at rate equal to or greater than the product of n and r.

12. The method of claim 9 further comprising the steps of:

assigning a unique segment identification number to each of the n subsequences; and inserting data representative of the unique segment identification numbers into the retrieved interleaved data stream to identify to which of the n subsequences each of the elements belongs.

13. The method of claim 12 wherein the unique segment identification numbers are sequentially increasing with the sequence order of the segments comprising the video program.

14. The method of claim 13 further comprising the steps of:

for each retrieval and transmission of the interleaved data stream, inserting a flag to denote the one of n subsequences representative of the first segment of the video program; and decrementing the currently assigned segment identification numbers for each of the n subsequences upon completion of each retrieval and transmission of the interleaved data stream.

15. The method of claim 2 wherein said step of compressing the data stream is performed statistically.

16. The method of claim 15 wherein said step of statistically compressing further comprises the step of encoding each of the n subsequences in accordance with a specified error tolerance to produce n encoded subsequences of elements.

17. The method of claim 16 wherein said step of statistically compressing further comprises the steps of:

summing the amount of data in the compressed and interleaved sequence of elements during a fixed time interval;

increasing the specified error tolerance whenever the summed data exceeds a first predetermined throughput; and decreasing the specified error tolerance whenever the summed data falls below a second predetermined throughput.

18. The method of claim 17 wherein said step of encoding each of the n subsequences is performed on each of the n subsequences concurrently and wherein each of the n encoded subsequences of elements are produced synchronously.

19. The method of claim 18 wherein said interleaving step, said summing step and said steps of increasing and decreasing the error tolerance are performed in real time on said n encoded subsequences of elements.

20. The method of claim 16 wherein said step of statistically compressing further includes the steps of:

summing the amount of data in the compressed and interleaved sequence of elements during a fixed time interval;

increasing the specified error tolerance of one or more elements within the fixed time interval during which the sum of data exceeds a first predetermined throughput;

decreasing the specified error tolerance of one or more elements within the fixed time interval during which the sum of data falls below a second predetermined throughput; and repeating said steps of encoding, interleaving, summing, increasing the specified error tolerance and decreasing the specified error tolerance until no further increases or decreases in the specified error tolerance are required.

21. The method of claim 1, 3, 5, 13, wherein the step of interleaving further comprises the steps of:

assigning a unique segment identification number to each of the n subsequences; and inserting data representative of the unique segment identification numbers into the interleaved data stream to identify to which of the n subsequences each of the elements belongs.

22. The method of claim 2 further comprising the steps of:

partitioning the interleaved data stream into two or more portions, each of the portions comprising compressed data representative of an equal number of pixels; and storing each of the two or more portions on a different storage device.

23. The method of claim 2 further comprising the steps of:

partitioning the interleaved data stream into two or more portions, each of the portions comprising the same amount of data;

storing each of the two or more portions on a different storage device; and whenever the two or more portions cannot have an equal amount of data, adding filler data to one or more of the two or more portions to render the two or more portions equal in amount of data.

24. The method of claim 22 further comprising the steps of:

concurrently retrieving the two or more portions from the two or more storage devices;

transmitting each of the concurrently retrieved two or more portions simultaneously over separate channels of a video distribution medium; and repeating said concurrently retrieving and said transmitting steps continuously for a predetermined time.

25. The method of claim 23 further comprising the steps of:

concurrently retrieving the two or more portions from the two or more storage devices;

transmitting each of the concurrently retrieved two or more portions simultaneously over separate channels of a video distribution medium; and repeating said concurrently retrieving and said transmitting steps continuously for a predetermined time.

26. A method of providing concurrent access to an ordered sequence of a plurality of n segments comprising a video program, said method comprising the steps of:

partitioning a data stream comprising an ordered sequence of data representative of the video program into n subsequences, each of the n subsequences comprising a portion of the data stream representative of one of the n segments, the data of each of the n subsequences organized as an ordered sequence of elements wherein at least two of the elements in at least one of the subsequences correspond to at least part of different frames of the video program; and interleaving the elements of the n subsequences to produce an interleaved data stream.

* * * * *